UNITED STATES PATENT OFFICE.

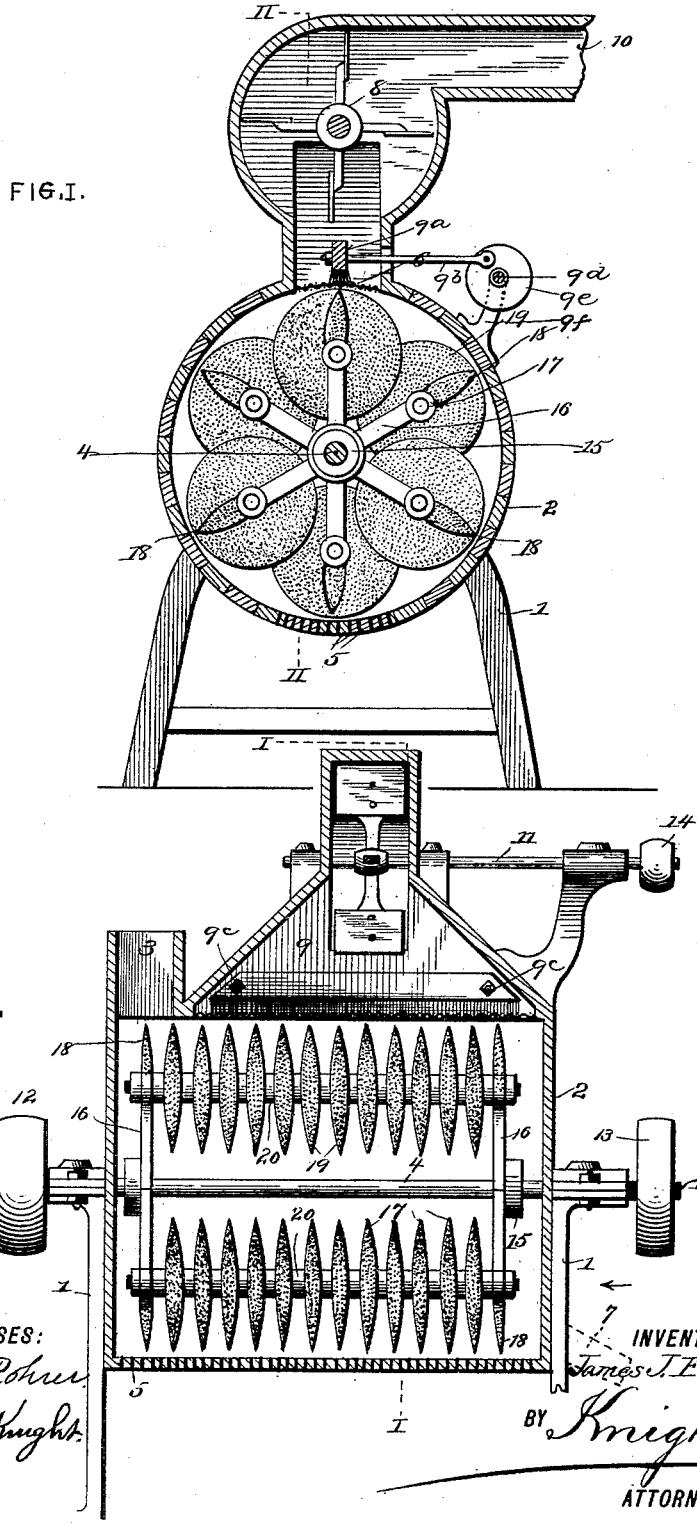

JAMES J. FAULKNER, OF MEMPHIS, TENNESSEE, ASSIGNOR OF TWO-THIRDS TO THE NATIONAL COTTON SEED OIL AND HULLER COMPANY, OF SAME PLACE.

COTTON-SEED LINTER.

SPECIFICATION forming part of Letters Patent No. 462,634, dated November 3, 1891.

Application filed December 24, 1890. Serial No. 375,688. (No model.)

*To all whom it may concern:*

Be it known that I, JAMES J. FAULKNER, a citizen of the United States, residing at Memphis, county of Shelby, and State of Tennessee, have invented certain new and useful Improvements in Cotton-Seed Linters, of which the following is a full, clear, and exact description.

This invention relates to machines in which the lint is taken from the surface of the cotton-seed and then drawn off by a suitable fan through a guarded outlet to a condenser or other place to be utilized; and this invention consists in providing means whereby the lint may be more thoroughly removed from the seed.

To these ends the invention consists in mounting in a suitable cylinder having a hopper for feeding the cotton-seed, a guarded outlet, through which the lint is drawn, and a spout for the passage of the seed operated upon, an agitator, consisting of a shaft having spiders, supplemental shafts in the spider-arms, and a number of revoluble disks mounted on the supplemental shafts and caused to rotate by frictional contact with the sides of the cylinder or with the seeds, &c., between the sides of the cylinders and their peripheries. Along the bottom of the casing is provided a perforate guard over an opening for allowing the escape of dirt or dust without the passage of the seed. The lint is drawn off by an air-current.

In order that the invention may be more fully understood, I will proceed to describe it with reference to the accompanying drawings, in which—

Figure I is a vertical transverse section taken on line I I, Fig. II, the fan or agitator being shown in elevation. Fig. II is a vertical longitudinal section of the preferred and most effective form of my machine, taken on the line I I, Fig. I, the agitator being shown in elevation and all but the upper and lower series of disks being removed for the sake of clearness.

1 represents the frame; 2, the casing; 3, a suitable hopper, and 4 the main shaft; 5, the bottom outlet for dust; 6, the upper outlet for lint, guarded by wire-netting, and 7 the seed-spout; 8, the fan; 9, the air-trunk leading to the fan; and 10 represents the passage through which the lint is passed by the fan to a suitable condenser or other place.

12 represents the drive-pulley, 13, the pulley for transmitting motion to the fan, and 14 a pulley on the fan-shaft 11, which receives power from the pulley 13.

15 represents the spiders having radial arms 16; 17, the shafts in the ends thereof; 18, projections on the ends of the spider to be coated with emery for offering an additional scouring-surface for the seed; 19, the revoluble disks mounted loosely on their shafts, so that they will revolve as they are carried around in the cylinder and thus continue to present new friction-surfaces to the seed; and 20 represents the spacing-blocks placed between the rotary disks on the shaft for keeping them in proper position.

The wire guard 6 is preferably constructed with a long narrow mesh, so that the long fibers will be permitted to pass, while the seeds and other bulky particles will be arrested.

In order to prevent the fiber or lint from clogging up the meshes of the guard 6, I mount within the flume 9 a long brush 9ª, which extends substantially the entire length of the guard, as shown in Fig. II, and is projected back and forth over the guard by means of two arms or pitmen 9ᵇ, attached at their inner ends to the brush 9ª at the points 9ᶜ. The outer ends of these pitmen are connected, respectively, to two crank-disks 9ᵉ, (one only being shown,) one at each end of a shaft 9ᵈ. The shaft 9ᵈ is journaled in brackets 9ᶠ and is driven from any suitable source of power or by belt connection (not shown) with the fan-shaft 11. The disks 19, as shown in Fig. I, intermesh or overlap and thus form in cross-section one large friction-surface, substantially equal in area to the cross-section of the interior of the casing.

Having thus described my invention, what I claim as new, and desire to secure by Letters Patent, is—

1. In a cotton-seed linter, the combination, with a suitable casing having an inlet and an outlet for seed and an outlet for the lint, of a shaft passing through the casing, and disks mounted upon said shaft provided with roughened surfaces for removing the lint from the seed, a guard arranged over the lint-outlet, a brush impinging said guard, the shaft $9^d$, and crank-and-pitman connection between said shaft and brush, substantially as herein set forth.

2. The combination, in a cotton-seed linter, of the main shaft, spiders mounted on the shaft, supplementary shafts in the ends of the spider-arms, and revoluble disks mounted on the respective supplementary shafts and overlapping each other, the whole being arranged in a suitable casing having an inlet and outlet for the seed and an outlet for lint, substantially as and for the purpose set forth.

3. In a cotton-seed linter, the combination, with a suitable casing having an inlet and an outlet for the seed, the guarded outlet for the lint, and means for drawing the lint through the guarded outlet, of a shaft centrally arranged in the casing, spiders located upon the shaft having radial arms, and supplemental shafts mounted in the ends of the spider-arms, and intermeshing revoluble roughened disks mounted upon the supplemental shafts for scouring the seed, substantially as and for the purpose set forth.

4. The combination of the casing having an inlet and outlet for seed and an outlet for lint, the shaft, the spiders having radial arms with scouring ends, the said shafts carrying disks and mounted in the radial arms within the scouring ends.

JAMES J. FAULKNER.

Witnesses:
D. H. POSTON,
J. J. MURPHY.